United States Patent [19]

Tibbits et al.

[11] 4,420,787

[45] Dec. 13, 1983

[54] WATER PUMP PROTECTOR

[75] Inventors: John L. Tibbits, Centerville; Lamar D. Springer, Spring Valley; John W. Sellers, Jr., Xenia, all of Ohio

[73] Assignee: Spring Valley Associates Inc., Centerville, Ohio

[21] Appl. No.: 327,269

[22] Filed: Dec. 3, 1981

[51] Int. Cl.³ .............................................. H02H 3/26
[52] U.S. Cl. ....................................... 361/79; 361/85; 318/455; 417/45
[58] Field of Search ............... 361/79, 85, 30; 417/45; 318/455, 474, 479, 805, 806

[56] References Cited

U.S. PATENT DOCUMENTS

| | | |
|---|---|---|
| 2,953,722 | 9/1960 | Willis ..................................... 361/85 |
| 3,417,290 | 12/1968 | Craddock ......................... 361/30 X |
| 3,519,910 | 7/1970 | Pfaff et al. . |
| 3,600,657 | 8/1971 | Pfaff . |
| 3,931,559 | 1/1976 | McKee . |
| 3,953,777 | 4/1976 | McKee . |
| 4,117,408 | 9/1978 | Comstedt ........................ 318/805 X |
| 4,286,925 | 9/1981 | Standish . |
| 4,290,007 | 9/1981 | Fisher et al. . |

FOREIGN PATENT DOCUMENTS 650153  2/1979  U.S.S.R. ................................ 361/79

Primary Examiner—Reinhard J. Eisenzopf
Attorney, Agent, or Firm—Jacox & Meckstroth

[57] ABSTRACT

A water pump protector which includes electrical circuitry through which an electric motor is energized. The electric motor operates a water pump. The circuitry senses the phase angle between the voltage and the current applied to the electric motor. When the phase angle indicates that the motor is operating without a load, the circuitry deenergizes the electric motor. Thus, the water pump is protected against damage which may occur when the water pump is operated without pumping water.

6 Claims, 3 Drawing Figures

WATER PUMP PROTECTOR

BACKGROUND OF THE INVENTION

In numerous installations, a water pump and the electric motor which operates the water pump are submerged within the body of water from which water is pumped. In other water pump installations, a water pump and an electric driving motor may be located a considerable distance from the electric control unit which supplies electrical energy to the electric motor. In each water pump installation, there is a possibility that the supply of water at the pump may cease or a coupling between the driving electric motor and the water pump may break, or for some other reason the electric motor operates without pumping operation of the water pump. If the supply of water to the water pump ceases, the pump may be severely damaged if it is operated. If the coupling between the electric motor breaks or for some other reason the pump is operated without pumping action, a signal should be provided in regard to such a condition, and/or the motor should be deenergized.

Numerous types of water pump protector devices and indicator or signal circuits have been devised. Most of the pump protector devices require a separate mechanism to sense the water level condition and to provide a signal for manual or automatic deenergization of the electric driving motor. However, such devices require a separate electric circuit which extends from the body of water to the electric motor control unit. In most installations, the distances between the body of water and the electric motor control unit may be considerable and require long lengths of electric wire, as well as requiring a separate mechanism at the water level or in the body of water. Therefore, such protective devices have disadvantages. Pump protective or pump malfunction indicator devices and circuits which do not require separate mechanisms or circuits are usually complex and costly and are therefore objectionable.

It is an object of this invention to provide electrical circuitry through which electrical energy is supplied to an electric motor which operates a liquid pump and in which the electrical circuitry deenergizes the electric motor if, for any reason, the liquid pump is not pumping liquid. Thus, it is an object of this invention to provide electrical circuitry which protects the liquid pump against damage and which may also serve as an indicator that the electric motor is operating without pumping action in the pump.

It is another object of this invention to provide such electrical circuitry which is relatively low in cost to produce and to install.

Other objects and advantages of this invention reside in the construction of parts, the combination thereof, the method of production, and the mode of operation, as will become more apparent from the following description.

SUMMARY OF THE INVENTION

A water pump protector of this invention is adapted to be joined to an electric motor which operates a liquid pump, such as a water pump. The electrical circuitry comprises means to sense the phase angle between the voltage and the current supplied to an electric motor. The circuitry also includes means for comparing the phase angle between the voltage and the current and to deenergize the electric motor when the phase angle between the voltage and the current exceeds a predetermined magnitude.

DETAILED DESCRIPTION OF THE INVENTION

Figure 1:
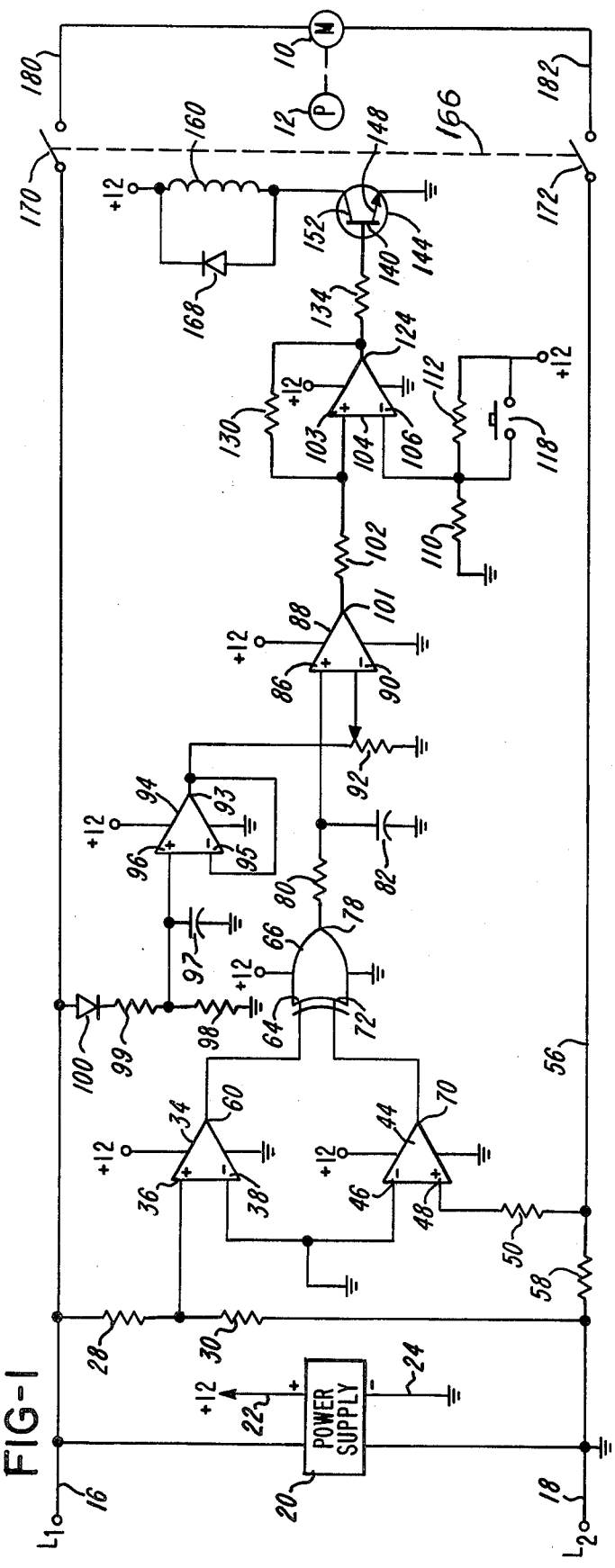
FIG. 1 is a schematic diagram of the electrical circuitry of this invention.

The circuitry of this invention provides electrical energy to an electric motor 10 which operates a water pump 12. The pump 12 and the motor 10 are conventionally submerged within a body of water from which water is pumped by the pump 12 and by operation of the motor 10.

The electrical energy for operation of the electric motor 10 is provided through incoming lines 16 and 18. The incoming line 18 is shown as being grounded only for denoting a reference point for the electrical circuitry of this invention.

Joined to the incoming lines 16 and 18 is a power supply unit 20 which provides electrical energy to the numerous devices of the circuitry. The power supply unit 20 is shown as having an output line 22 of positive potential, herein illustrated as 12 volts D.C., and an output line 24 of ground potential.

Connected between the incoming lines 16 and 18 is a resistor 28 and a resistor 30, which are connected in series to constitute a voltage divider circuit. An operational amplifier 34 has an input terminal 36 joined to the resistors 28 and 30. Another terminal 38 of the operational amplifier 34 is shown connected to ground potential.

An operational amplifier 44 has a terminal 46 joined to ground potential and a terminal 48 joined to a resistor 50. The resistor 50 is connected to a power line 56, which is connected to the incoming line 18 through a resistor 58.

The operational amplifier 34 has an output terminal 60 connected to a terminal 64 of an exclusive-OR-gate device 66. The operational amplifier 44 has an output terminal 70 joined to a terminal 72 of the exclusive-OR-gate device 66. The exclusive-OR-gate device 66 has an output terminal 78 joined to a resistor 80 which is connected to ground potential through a capacitor 82. The resistor 80 is also connected to an input terminal 86 of an operational amplifier 88. The operational amplifier 88 also has an input terminal 90 connected to a reference potential through an adjustable resistor 92. The adjustable resistor 92 is also shown connected to an output terminal 93 of an operational amplifier 94. The operational amplifier 94 has an input terminal 95 which is connected to the output terminal 93. The operational amplifier 94 also has an input terminal 96 which is joined to a capacitor 97 and to resistors 98 and 99. The resistor 98 is also connected to ground potential. The resistor 99 is also joined to a diode 100, which is connected to the incoming line 16.

The operational amplifier 88 has an output terminal 101 connected to a resistor 102. The resistor 102 is also joined to an input terminal 103 of an operational amplifier 104. The operational amplifier 104 also has an input terminal 106 which is connected to ground potential through a resistor 110. A resistor 112 is also connected to the input terminal 106 and to the output of the power supply unit 20. Connected across the resistor 112 is a momentary reset switch 118. The operational amplifier 104 has an output terminal 124 which is connected to the input terminal 103 through a resistor 130. The output terminal 124 of the operational amplifier 104 is also joined to a resistor 134 which is also connected to a base 140 of a transistor 144. The transistor 144 also has an emitter 148 which is shown connected to ground potential. The transistor 144 also has a collector 152 which is joined to an actuator coil 160 of a power switch 166. A diode 168 is shown connected across the actuator coil 160. The power switch 166 has normally closed switch members 170 and 172 which are joined to output lines 180 and 182, to which the electric motor 10 is connected.

OPERATION

Any suitable voltage is applied to the incoming lines 16 and 18 for operation of the electric motor 10 and for energization of the elements of the control circuitry. The voltage applied to the incoming lines 16 and 18 is applied to the motor 10 through the normally closed switches 170 and 172. The power supply output lines 22 and 24 are effectively joined, in a manner not illustrated, to devices of the circuitry such as devices 34, 44, 66, 88, and 104 for energization thereof.

The input terminals 36 and 38 of the operational amplifier 34 are connected to sense the voltage between the incoming lines 16 and 18. The output of the operational amplifier 34 at the output terminal 60 is positive, herein shown as 12 volts, during each positive half cycle of the voltage applied to the input lines 16 and 18. During each negative half cycle of this voltage the output voltage of the operational amplifier 34 is zero. This output of the operational amplifier 34 is applied to the input terminal 64 of the exclusive-OR-gate 66.

The signal applied to the terminals 46 and 48 of the operational amplifier 44 is a voltage generated by current flow through the resistor 58. Therefore, the voltage applied to the terminals 46 and 48 is in phase with the current flow through the resistor 58 and in phase with the current flow in the line 56. The signal at the output terminal 70 of the operational amplifier 44 is positive, herein shown as 12 volts, during each positive half cycle of the current flow through the resistor 58. During each negative half cycle of the current flow through the resistor 58 the output voltage of the operational amplifier 44 at the output terminal 70 is zero. This output voltage of the operational amplifier 44 is applied to the terminal 72 of the exclusive-OR-gate 66. The exclusive-OR-gate 66 herein serves as a phase detector.

Figure 2:
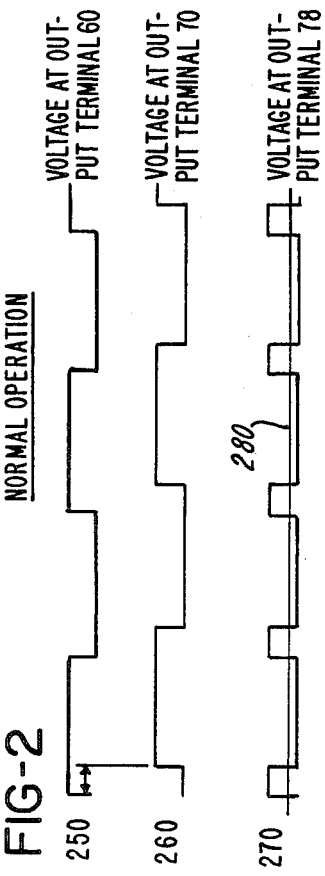
FIG. 2 is a set of electric wave forms which illustrate operation of an electric motor while a liquid pump operated thereby is pumping liquid.

FIG. 2 shows wave forms 250, 260, and 270, which illustrate conditions within the electric motor 10 during the time that the motor 10 is pumping water. Wave form 250 represents the voltage at the output terminal 60 of the operational amplifier 34, which voltage is in phase with the voltage across the incoming lines 16 and 18. Wave form 260 represents the voltage at the output terminal 70 of the operational amplifier 44, which voltage is in phase with the current flow in the incoming line 18. Wave form 270 of FIG. 2 illustrates the voltage at the output terminal 78 of the exclusive-OR-gate 66, and also illustrates the magnitude of the phase angle between the voltage applied across incoming lines 16 and 18 and the current in the power line 56. Due to the fact that the motor 10 under normal load conditions has less than unity power factor, there is a phase angle between the voltage and current applied to the motor 10, as illustrated in FIG. 2.

It is to be noted that the wave form 270 in FIG. 2 which illustrates the voltage at the output terminal 78 of the exclusive-OR-gate 66, is positive only during the period of time that only one of the wave forms 250 and 260 is zero. The voltage represented by the wave form 270 has an average voltage level 280, as illustrated in FIG. 2. This average voltage level 280 is relatively low because the voltage represented by the wave form 270 is zero during most of the time.

Figure 3:
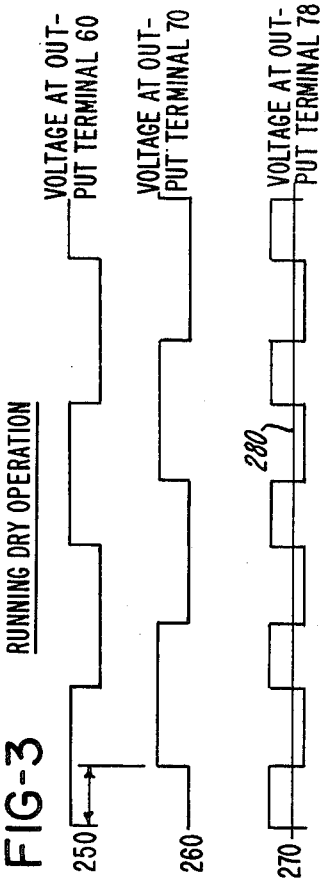
FIG. 3 is a set of electric wave forms which illustrate operation of the electric motor when the liquid pump is not pumping liquid.

If the supply of water to the pump 12 ceases, the pump 12, operated by the motor 10, does not pump water. Under such conditions, the circuitry of this invention functions as illustrated in FIG. 3. It is noted that the phase angle between the voltage and the current applied to the motor 10 increases significantly over that illustrated in FIG. 2. Therefore, the period of time during which there is a voltage at the output terminal 78 of the exclusive-OR-gate 66 is significantly increased, as illustrated by the wave form 270 in FIG. 3. In both FIGS. 2 and 3 the average voltage level 280 is directly proportional to the phase angle between the wave forms 250 and 260. As illustrated in FIG. 3, the average output voltage 280 at the terminal 78 of the exclusive-OR-gate 66 is significantly greater during the time that the pump 12, operated by the electric motor 10, is not pumping water, and as the motor 10 continues to operate. This average output voltage 280 at the terminal 78 is applied to the resistor 80 and the capacitor 82, which serve to filter the alternating current component from this output voltage and to provide the average direct current voltage 280, illustrated in FIG. 3, to the input terminal 86 of the operational amplifier 88.

The operational amplifier 88 compares the voltage applied to the terminal 86 with a voltage applied to the terminal 90 thereof. The voltage applied to the terminal 90 is a direct current voltage proportional to the alternating current line voltage across lines 16 and 18. The voltage applied to the terminal 90 is adjustable through the resistor 92. The alternating current voltage at the line 16 is rectified by the diode 100 and is directed to the voltage divider formed by the resistors 99 and 98. The voltage at the junction of the resistors 98 and 99 is filtered by the capacitor 97 and is supplied to the input terminal 96 of the operational amplifier 94. The operational amplifier 94 is connected as a unitary gain buffer which transmits the voltage on the capacitor 97 to the resistor 92. This voltage is applied to the input terminal 90 of the operational amplifier 88. Therefore, the voltage applied to the input terminal 90 of the operational amplifier 88 is proportional to the alternating current line voltage between the lines 16 and 18. Thus, there is compensation for phase angle variations which may occur with variations in the voltage applied to the incoming lines 16 and 18.

During the time that the average voltage level 280 of the exclusive-OR-gate 66 is relatively low, as illustrated in FIG. 2, the voltage applied to the terminal 86 of the operational amplifier 88 is less than the voltage applied to the terminal 90 of the operational amplifier 88. Under these conditions, there is no output from the operational amplifier 88 at the output terminal 101.

However, when the pump 12 which is operated by the motor 10 ceases the pump water, and the conditions become those illustrated in FIG. 3, the average voltage level 280 illustrated in FIG. 3 becomes so great that the voltage applied to the terminal 86 of the operational amplifier 88 exceeds the voltage applied to the terminal 90 of the operational amplifier 88. Therefore, the operational amplifier 88 produces a voltage at the output terminal 101 thereof. This voltage is transmitted to the input terminal 103 of the operational amplifier 104. This voltage which is applied to the terminal 103 of the operational amplifier 104 is greater than the constant voltage applied to the terminal 106 thereof. Therefore, a positive signal is created at the output terminal 124 of the operational amplifier 104. A positive feedback voltage is applied to the input terminal 103 from the output terminal 124 of the operational amplifier 104, through the resistor 130. Thus, there is constant output voltage at the terminal 124 of the operational amplifier 104, beginning the instant that a voltage output is initiated at the terminal 124. Thus, a "latch-in" condition exists.

The output voltage at the terminal 124 of the operational amplifier 104 creates a current flow through the resistor 134 to the base 140 of the transistor 144. When this occurs, the transistor 144 transmits current through the actuator coil 160. This current flow operates the power switch 166 to open the switch members 170 and 172. When this occurs, the electric motor 10 is deenergized, and the pump 12 ceases to operate.

Thus, the pump 12 is protected against damage which occurs if the pump 12 should be operated without pumping water.

The reset switch 118 is employed to momentarily connect the terminal 106 of the operational amplifier 104 to the full power supply voltage to increase the voltage applied to the terminal 106, to deenergize the operational amplifier 104 when the pump 12 again has water to pump. The reset switch 118 may be operated manually or automatically.

Although the preferred embodiment of the water pump protector of this invention has been described, it will be understood that within the purview of this invention various changes may be made in the form, details, proportion and arrangement of parts, the combination thereof, and the mode of operation, which generally stated consist in a water pump protector within the scope of the appended claims.

The invention having thus been described, the following is claimed:

1. Protective circuitry for a liquid pump which is operated by an electric motor which is connected to a source of alternating current energy through a pair of electric conductors and switch means, comprising:
  voltage divider means joined to the electric conductors,
  a first operational amplifier, the first operational amplifier having a pair of input terminals and an output terminal,
  means joining the input terminals of the first operational amplifier to the voltage divider means to provide a voltage representing the voltage between the electric conductors and in phase therewith,
  a second operational amplifier, the second operational amplifier having a pair of input terminals and an output terminal,
  means joining the input terminals of the second operational amplifier to at least one of the electric conductors to provide voltage representing the current flow through the electric conductor and in phase with the current flow through the electric conductor,
  an exclusive-OR-gate provided with a pair of input terminals and an output terminal,
  means joining the output terminals of the operational amplifiers to the input terminals of the exclusive-OR-gate,
  a third operational amplifier, the third operational amplifier being provided with a pair of input terminals and an output terminal,
  means joining the output terminal of the exclusive-OR-gate to one of the input terminals of the third operational amplifier,
  means joining the other input terminal of the third operational amplifier to one of the electric conductors,
  a fourth operational amplifier, the fourth operational amplifier having a pair of input terminals and an output terminal,
  means joining the output terminal of the third operational amplifier to one of the input terminals of the fourth operational amplifier, and means joining said one input terminal of the fourth operational amplifier to the output terminal thereof,
  means joining the other input terminal of the fourth operational amplifier to a source of direct current voltage,
  a transistor provided with a base, a collector and an emitter,
  means joining the output terminal of the fourth operational amplifier to the base of the transistor,
  an electrical actuator member for operation of the switch means,
  means joining the collector of the transistor to the electrical actuator member,
  means joining the emitter of the transistor to a source of direct current voltage,
  the first and second operational amplifiers providing representative voltages to the exclusive-OR-gate in accordance with the voltage applied to the electric conductors and the current through said one conductor, the exclusive-OR-gate detecting the time sequence between said voltage at the output terminal of the first operational amplifier with respect to the voltage at the output terminal of the second operational amplifier, the exclusive-OR-gate emitting an average output voltage in accordance with the total time period that both of the operational amplifiers are emitting a voltage, the third operational amplifier emitting an output voltage when the average output voltage of the exclusive-OR-gate exceeds a given magnitude, the fourth operational amplifier emitting an output current to the base of the transistor when the output voltage of the third operational amplifier exceeds a given magnitude, the transistor emitting a current sufficient to energize the electric actuator member, the electric actuator member thus operating the switch means to deenergize the electric motor to protect the pump which is operated by the electric motor.

2. The protective circuitry of claim 1 in which the means joining the output terminal of the exclusive-OR-gate to the third operational amplifier includes electrical filter means.

3. The protective circuitry of claim 1 in which the means joining said other input terminal of the third operational amplifier to one of the electric conductors includes means for generating a variable reference voltage.

4. The protective circuitry of claim 1 in which the means joining the input terminals of the second operational amplifier to at least one of the electric conductors includes resistance means.

5. A protective circuit for a liquid pump which is operated by an electric motor comprising:
   alternating circuit electric circuit means for connection to a source of electrical energy and for energization of the electric motor,
   sensing means for deenergization of the electric motor including first sensing means sensing the alternating current voltage applied to the electric circuit means and providing a constant direct current voltage during each half cycle that the voltage applied to the electric circuit means has a given potential, second sensing means sensing the alternating current flow in the electric circuit means and providing a constant direct current voltage during each half cycle that alternating current flow is in a given direction,
   phase detector means,
   means joining the first and second sensing means to the phase detector means, the phase detector means providing a direct current voltage output during the time that both the first sensing means and the second sensing means produce a direct current voltage,
   voltage level detector means,
   means joining the voltage level detector means to the phase detector means and to the alternating current electric circuit means and providing a direct current potential during the time that the average direct current voltage output of the phase detector means exceeds a potential applied to the voltage level detector means from the electric circuit means,
   and connection means joining the voltage level detector means to the means for deenergization of the electric motor for deenergization of the electric motor when the average current voltage output of the phase detector means provides a direct current potential in excess of a given magnitude.

6. The protective circuit of claim 5 in which the connection means includes latch means providing a substantially constant current output after energization thereof and amplifier means for amplifying the output current of the latch means for flow of current to the means for deenergization of the electric motor.

* * * * *